Feb. 19, 1935.  E. G. BUSSE  1,991,376
BRAKE BEAM SUPPORT
Filed Feb. 28, 1931  2 Sheets-Sheet 2
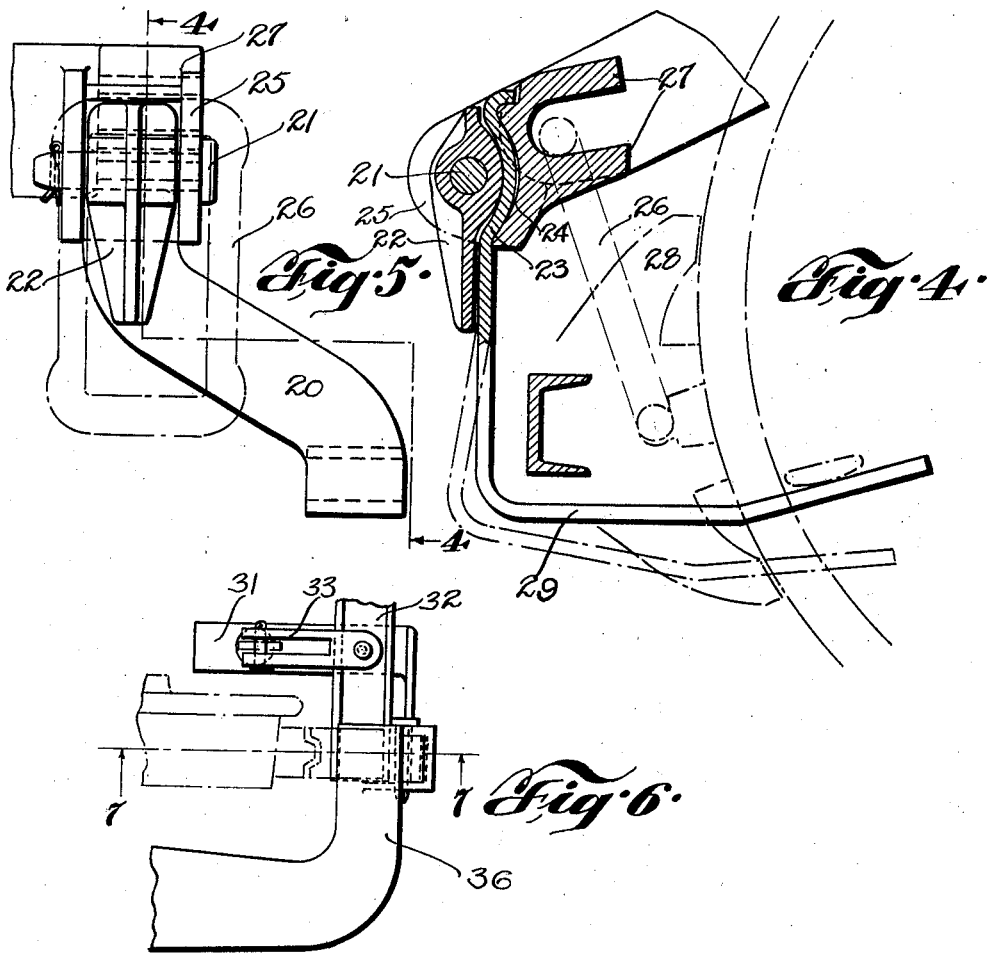
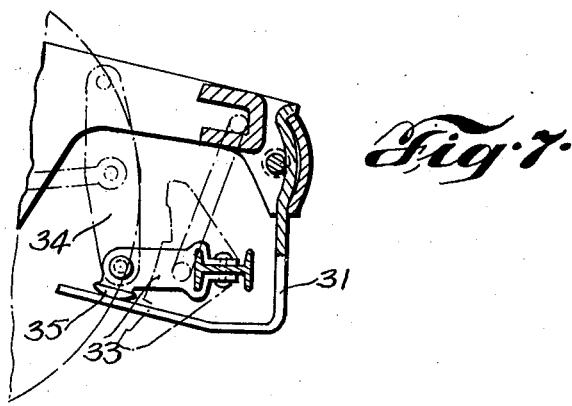
Inventor
Edwin G. Busse
By Rodney Bedell
Attorney Patented Feb. 19, 1935

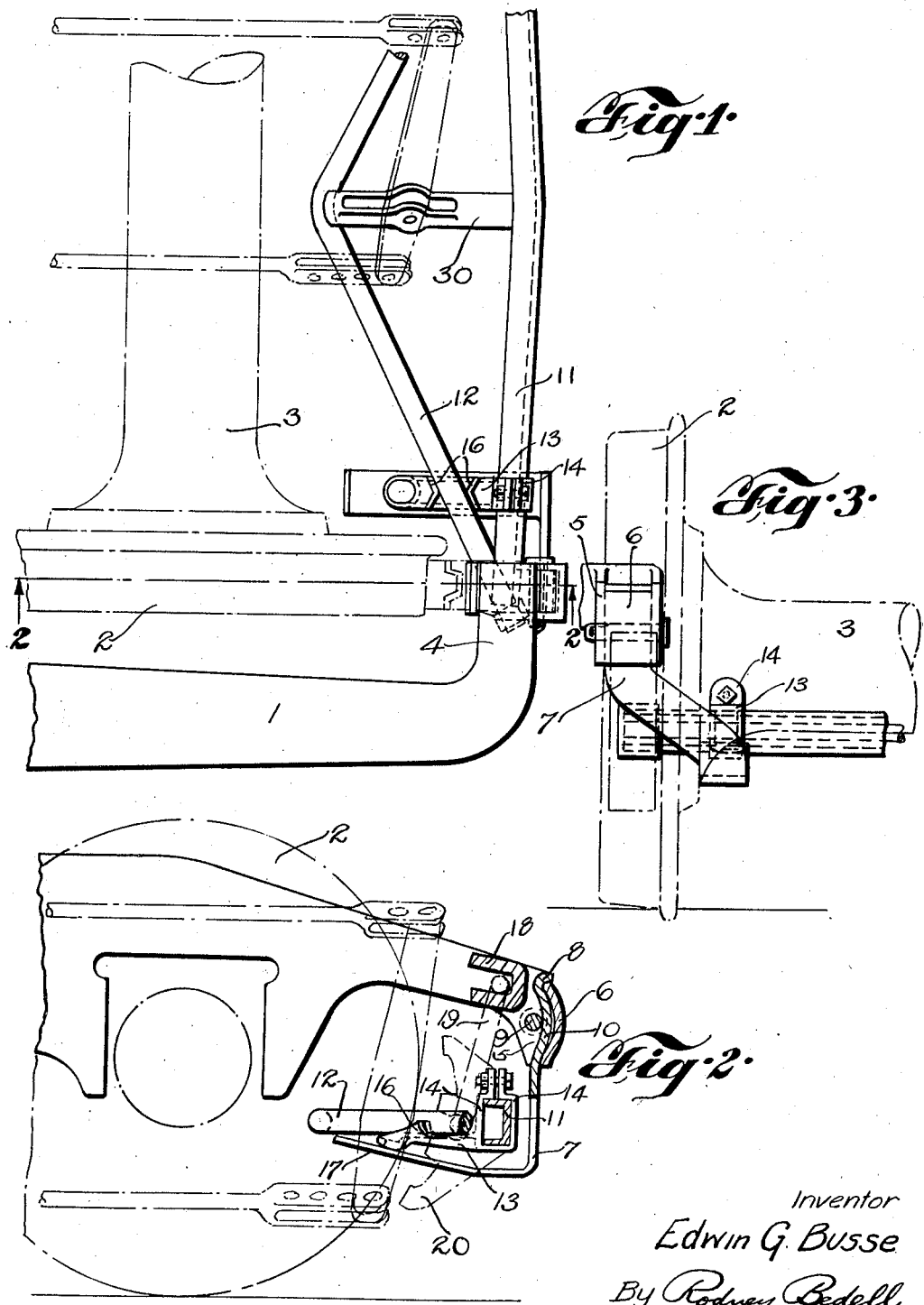

1,991,376

UNITED STATES PATENT OFFICE 1,991,376

BRAKE BEAM SUPPORT

Edwin G. Busse, Chicago, Ill., assignor to Chicago Railway Equipment Company, Chicago, Ill., a corporation of Illinois Application February 28, 1931, Serial No. 519,205

15 Claims. (Cl. 188—213)

My invention relates to railway rolling stock and consists particularly in improved guard, guide, or fourth point support means for brake beams.

In E. G. Busse Patent No. 1,650,931, and in co-pending application, Serial No. 485,206, filed September 29, 1930 in the same name, now Patent No. 1,882,207 various means are disclosed for mounting fourth point supports directly on arms extending inwardly from the truck frame. In each case, the arm for carrying the brake beam support necessarily extends inwardly a substantial distance beyond the bracket which is ordinarily provided by truck frame manufacturers for attaching the brake hangers and such extension results in excessive additional expense and is therefore objectionable.

The main object of the present invention is to provide a fourth point support which may be mounted on the brake hanger bracket or an element similarly located on the side frame above the brake beam and which will require only slight variation in the truck frame now in general use. I attain this general object and other detail objects in the structure illustrated in the accompanying drawings in which Figure 1 is a fragmentary top view of a truck embodying my invention.

Figure 2 is a vertical longitudinal section taken on line 2—2 of Figure 1.

Figure 3 is a detail end view showing the essential features of the invention.

Figure 4 is a vertical section taken on line 4—4 of Figure 5 and showing a modified form of the invention.

Figure 5 is a detail end view of the same.

Figure 6 is a fragmentary top view of a truck showing my novel support applied to a solid type brake beam.

Figure 7 is a vertical longitudinal section taken on line 7—7 of Figure 6.

The truck shown in the figures includes cast sideframe members 1 carried on wheels 2 and axles 3 through the usual journal boxes (not shown). At each end of the truck frame above the brake beam a short bracket 4 is provided having a bifurcated open-end jaw 18 for receiving a brake hanger 19, indicated in dot and dash lines, which, at its lower end, carries a brake head 20 mounted on the end of the brake beam which includes a compression member 11, a tension member 12, and a strut 30. The inner end of bracket 4 is also provided with vertical ribs 5 located below and on each side of jaw 18, and connected by an arcuate web 6.

The guard, guide, or support member 7 comprises a strap, preferably of resilient material, and has a rearwardly turned flange 8 at its upper end which hooks over the top of arcuate web 6. A pin 9, extending between ribs 5, presses the slightly curved portion 10 of the support into the concave inner face of web 6, causing sufficient distortion of the support to prevent rattling. The support 7 is inclined downwardly and transversely of the truck (Figure 3) to a point slightly below the level of the brake beam and then extends longitudinally of the truck beneath the beam.

An interchangeable supporting chair 13 has clamping jaws 14 for gripping compression member 11 of the beam, and receives tension member 12 between a pair of opposing dove-tail guides 16. The chair rides on the upwardly inclined forward portion 17 of support 7.

In Figures 4 and 5, the upper end of support 29 is flanged in the opposite direction from that shown in Figure 2 to engage a recess in the back of the brake hanger bracket and pin 21, extending between vertical ribs 25, passes through and supports a backing casting 22 having a convex bearing surface which presses curved portion 23 of the support into the depression 24 in the bracket. Brake hanger 26 is received between jaws 27 and supports brake head 28 at its lower end in the usual manner.

In this form of the invention, the member 22 forms a rigid backing for the support 29 which may be extended downwardly as far as desired. The backing casting has the effect of distributing the counter resistance of the pin 21 over a considerable portion of the support member.

In Figures 6 and 7, I show my novel supporting strap 31, depending from bracket 36 and applied to a solid type brake beam including a transverse member 32 of I section, and a fulcrum arm 33 which is bifurcated to receive a brake lever 34. A supporting chair 35 depends from the forward end of fulcrum arm 33 and engages supporting strap 31. This arrangement of fulcrum arm, brake lever, and supporting chair is disclosed and claimed in detail in my co-pending application, Serial No. 517,068, filed February 19, 1931 and in itself does not comprise the present invention. In other respects, the form shown in Figures 6 and 7 corresponds with the forms previously described.

It is not essential that the support be associated with a brake hanger bracket located on an arm extending inwardly from the truck side frame as is usually the case, but the support may be secured to upper part of the side frame itself or a separate inwardly projecting bracket provided for that purpose.

The application of my novel support member to a truck requires the making of comparatively minor changes in the standard types of trucks now in general use. The device may be readily applied and removed and provides an effective fourth point support for either an outside or an intermediate brake beam. Obviously, the invention is not limited to the structure herein shown and described but various other modifications may be made without departing from the spirit of the invention, and I contemplate the exclusive use of all such variations as come within the scope of my claims.

I claim:

1. A truck side frame member having a brake hanger bracket projecting therefrom, there being an element on said bracket for seating a yielding brake beam guard, guide, or support member, and other elements for receiving a holding pin whereby said member may be distorted and pressed against said first mentioned element.

2. A truck side frame member including elements for mounting a brake hanger, spaced ribs projecting from said elements, and a connecting web co-operating with said ribs to receive and mount a brake beam guide, guard or support member, said web being immediately adjacent said elements.

3. In combination, a truck side frame having a short arm projecting inwardly therefrom, a member on the end of said arm for supporting a brake hanger, said arm having bifurcations and an arcuate web between said bifurcations and spaced from said member, and a pin for co-operating with said web and bifurcations to mount a brake beam guide, guard, or support member.

4. In combination, a truck side frame having a brake hanger bracket including a vertically bifurcated portion, a brake beam guard, guide, or support member having an upright arm seated in said bifurcated portion, and a backing element mounted in said bifurcated portion and having a face engaging said arm to hold said member in position.

5. In combination, a railway truck side frame with a brake hanger bracket having an inwardly extending horizontally bifurcated portion arranged for mounting a brake hanger, and outwardly extending spaced vertical webs, said portion having a depression in the rear surface thereof and between said webs, a brake beam guard, guide, or support member having a curved portion corresponding in contour with said depression, a backing element between said webs and having a convex face for engaging the curved portion of said member, and a pin extending between said webs and through said backing element to hold the parts in assembled relation.

6. In combination, a railway truck side frame including a brake hanger bracket with hanger jaws and spaced vertical webs projecting oppositely from said jaws, a resilient guard, guide, or support member depending from said bracket, and a backing element mounted between said webs and extending along said member to provide rigidity for the portions thereof adjacent said bracket.

7. In combination, a brake hanger bracket, a brake beam having a fulcrum arm projecting therefrom, and a support for said beam including a strap inclining downwardly and inwardly from said bracket and a support chair depending from said fulcrum arm and engaging said strap.

8. In combination, a brake hanger bracket, a solid type brake beam having a fulcrum arm projecting therefrom, said arm having a portion shaped to receive a brake lever, and a support for said beam including a strap depending from said bracket and a support chair depending from the lever receiving portion of said arm and engaging said strap.

9. A fourth point support for a brake beam comprising a resilient strap with an upper portion arranged for attachment to a truck side frame member, an intermediate portion extending diagonally downwardly and inwardly from said member, and a lower portion disposed to normally engage and support the brake beam.

10. Railway brake beam guard, guide, or support means comprising in combination a truck side frame member, and a strap secured to said member and having a portion offset inwardly therefrom arranged to engage a cooperating element on the brake beam located a substantial distance inwardly from said member 11. Railway vehicle brake beam guard, guide or support means comprising in combination a brake hanger bracket having an arcuate surface, a resilient strap having a connection with said bracket and extending inwardly therefrom and then longitudinally of the vehicle to yieldingly support the brake beam, and securing means distorting said strap against said surface to prevent loosening of said connection.

12. In combination in a railway vehicle, a side frame, a brake beam having a bearing element spaced inwardly of said frame, a brake hanger bracket having an arcuate portion, a resilient guard, guide or support member having a connection with said bracket and a portion engaging said element, and securing means causing distortion of said member against the arcuate portion of said bracket to prevent loosening of said connection due to repeated movement of said beam.

13. In a railway spring-plankless truck, a side frame part, a resilient brake beam guard, guide or support member secured thereto, and associated members on said part and said member co-operating to prevent rattling thereof.

14. In a railway truck, a side frame part including an arcuate surface, a brake beam guard, guide or support device having a portion for association with the brake beam, and a resilient portion secured to said frame part adjacent said surface, and means distorting said resilient portion against said surface to prevent rattling of interengaging parts.

15. In a railway truck, a side frame part, a brake beam assembly including a sliding bearing element, a resilient brake beam guard, guide or support member underlying said assembly and engaging said element, and means secured to said side frame above said beam and suspending said member.

EDWIN G. BUSSE.